United States Patent
Wei

(10) Patent No.: US 12,485,663 B1
(45) Date of Patent: Dec. 2, 2025

(54) METHOD FOR PREPARING EYE-PROTECTING SCREEN PROTECTOR

(71) Applicant: Shenzhen Piaohai Technology Co., Ltd., Shenzhen (CN)

(72) Inventor: Yunpeng Wei, Shenzhen (CN)

(73) Assignee: Shenzhen Piaohai Technology Co., Ltd., Shenzhen (CN)

(*) Notice: Subject to any disclaimer, the term of this patent is extended or adjusted under 35 U.S.C. 154(b) by 0 days.

(21) Appl. No.: 19/300,396

(22) Filed: Aug. 14, 2025

(51) Int. Cl.
*B32B 37/12* (2006.01)
*B32B 7/12* (2006.01)
*B32B 17/10* (2006.01)

(52) U.S. Cl.
CPC .......... *B32B 37/12* (2013.01); *B32B 7/12* (2013.01); *B32B 17/10* (2013.01); *B32B 2037/1253* (2013.01); *B32B 2255/10* (2013.01); *B32B 2255/26* (2013.01); *B32B 2264/1021* (2020.08); *B32B 2264/1024* (2020.08); *B32B 2264/1025* (2020.08); *B32B 2264/301* (2020.08); *B32B 2307/7376* (2023.05); *B32B 2457/20* (2013.01)

(58) Field of Classification Search
CPC .......... B32B 37/12; B32B 7/12; B32B 17/10; B32B 2037/1253; B32B 2255/10; B32B 2255/26; B32B 2264/1021; B32B 2264/1024; B32B 2264/1025; B32B 2264/301; B32B 2307/7376; B32B 2457/20
See application file for complete search history.

(56) References Cited

FOREIGN PATENT DOCUMENTS

| CN | 210030548 U | 2/2020 |
|---|---|---|
| CN | 211307676 U | 8/2020 |
| CN | 213483770 U | 6/2021 |

*Primary Examiner* — Sonya M Sengupta
(74) *Attorney, Agent, or Firm* — Nitin Kaushik

(57) ABSTRACT

Disclosed is a method for preparing an eye-protecting screen protector, which aims to address the issues of reduced luminous efficiency, color fading and shortened life of nano-luminous materials in existing products due to moisture and oxygen penetration. This method involves binding inorganic nanoparticles with surface hydroxyl groups with nano-luminescent materials through cross-linking materials. After raw material preparation, adhesive mixing, coating and curing, and glass lamination, a dense microscopic barrier structure is formed after UV curing, effectively blocking moisture and oxygen. Nano-luminescent materials can absorb 400 nm-480 nm harmful blue light and convert it into 500 nm-750 nm beneficial spectra to achieve eye protection. The product structure from outside to inside consists of tempered glass, a light conversion layer, a PET transparent film, a silicone layer and a release film, and is suitable for electronic devices including mobile phones and tablets, combining long-term stability with efficient eye-protecting performance.

10 Claims, 8 Drawing Sheets

Raw material preparation: mix inorganic nanoparticles surface-modified with hydroxyl ligands with a cross-linking material to allow binding between first functional groups of the cross-linking material and hydroxyl groups on the surfaces of the inorganic nanoparticles; disperse nano-luminescent materials in acrylate monomers, add the resulting mixture to the nanoparticle-crosslinking material system, enable binding between second functional groups of the cross-linking material and the nano-luminescent materials, to form modified nanoparticles

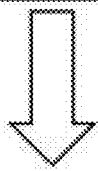

Adhesive mixing: disperse the modified nanoparticles in an optically clear adhesive (OCA) matrix material, add a photoinitiator and mix evenly

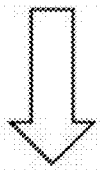

Coating and curing: coat the mixed adhesive solution onto the surface of a polyethylene terephthalate (PET) substrate with a pre-applied silicone layer, and then cure the coated substrate with ultraviolet light to form a light conversion layer

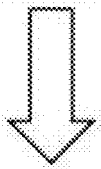

Glass lamination: laminate tempered glass on the surface of the light conversion layer, and then precision-cut the resulting composite structure to obtain an eye-protecting screen protector

FIG. 1

METHOD FOR PREPARING EYE-PROTECTING SCREEN PROTECTOR

TECHNICAL FIELD

This disclosure relates to the technical field of display screen protection, and in particular, to a method for preparing an eye-protecting screen protector with blue light conversion capability and long-term stability, which is suitable for eye protection for active light-emitting display screens utilized in mobile phones, tablet computers, laptops, televisions and similar electronic devices.

BACKGROUND

With the development of science and technology, individuals are increasingly required to interact with external information through display screens, with daily exposure to screens of mobile phones, tablet computers, laptops, and televisions exceeding 6 h or more. Prolonged exposure to display screens not only causes visual fatigue but also subjects users to blue light (400 nm-480 nm) emitted by the display screens that contains harmful spectral components that accelerate degenerative processes in visual function cells, thereby posing detrimental effects on ocular health.

This disclosure is based on a prior patent (CN213483770U) filed by the applicant, in which nano-luminescent materials were directly dispersed in optically clear adhesive (OCA) materials. However, the instability of the luminescent materials arose due to moisture absorption by carboxyl groups in the adhesive materials. This disclosure solves this issue by incorporating a cross-linked structure to further improve the deficiencies in the existing technologies. In the existing structure, the nano-luminescent materials (including II-VI group, III-V group, I-III-VI group, perovskite quantum dots and nano-rare earth luminescent materials) are mixed with the OCA materials, wherein the OCA materials consist essentially of acrylic resins (polyurethane acrylate and polyacrylate). Through coating and photocuring processes, a layered intermediate structure of OCA/PET (polyethylene terephthalate)/silicone is formed, and the tempered glass is then laminated with the OCA layer to finally prepare a screen protector with luminescent eye-protecting functions. The principle of luminescence and eye protection is that the product absorbs harmful blue spectral components (400 nm-480 nm), and emits beneficial spectral components (500 nm-750 nm) after conversion by nano-luminescent materials, thereby achieving eye protection.

In the existing technologies, acrylic resins server as the main component of OCA. Acrylic resins contain carboxyl functional groups. When designing formulations for OCA used for tempered film applications, the carboxyl content is often increased to meet elasticity requirements. However, the carboxyl functional groups are prone to moisture penetration. Nano-luminescent materials, including quantum dots and phosphors, exhibit reduced luminous efficiency when exposed to moisture, leading to color degradation over time.

To enhance the service life of the product, this disclosure employs inorganic nanoparticles that, upon ultraviolet (UV) curing, undergo cross-linking reactions with nano-luminescent materials to form a denser microscopic barrier structure. This structure effectively protects the nano-luminescent materials from moisture and oxygen penetration into the base resin, thereby achieving a longer service life.

SUMMARY

This disclosure aims to solve the technical issues in existing eye-protecting screen protectors, where nano-luminescent materials suffer from reduced luminous efficiency, color fading, and shortened service life due to moisture and oxygen penetration. A method is provided for preparing a screen protector that effectively blocks moisture and oxygen, protects the nano-luminescent materials, and improve stability and eye protecting effects. The specific steps are as follows:

(S1) raw material preparation: mixing inorganic nanoparticles surface-modified with hydroxyl ligands with a cross-linking material to allow binding between first functional groups of the cross-linking material and hydroxyl groups on the surfaces of the inorganic nanoparticle surface; dispersing the nano-luminescent materials in acrylate monomers, adding the resulting mixture to the nanoparticle-crosslinking material system, enabling binding between second functional groups of the cross-linking material and the nano-luminescent materials, to form modified nanoparticles;

(S2) adhesive mixing: dispersing the modified nanoparticles from step (S1) in an optically clear adhesive (OCA) matrix material, adding a photoinitiator and mixing evenly;

(S3) coating and curing: coating the mixed adhesive solution from step (S2) onto the surface of a polyethylene terephthalate (PET) substrate with a pre-applied silicone layer, and then curing the coated substrate with ultraviolet light to form a light conversion layer; and (S4) glass lamination: laminating the tempered glass on the surface of the light conversion layer, and then precision-cutting the resulting composite structure to obtain an eye-protecting screen protector.

The inorganic nanoparticles and the nano-luminescent materials are cross-linked via UV curing to form a dense microscopic barrier structure. The core of this technical solution lies in the preparation of raw materials, where the inorganic nanoparticles and the nano-luminescent materials are interconnected via cross-linking materials. Following UV curing, a dense microscopic barrier structure is formed, thereby achieving effective moisture-oxygen blocking for the nano-luminescent materials. Concurrently, the nano-luminescent materials are engineered to absorb harmful blue light within the wavelength range of 400 nm-480 nm and convert it into beneficial spectral components within 500 nm-750 nm, thereby addressing the issues of reduced luminous efficiency and color fading caused by moisture penetration in existing technologies, and enhancing the service life of the product. The integrated spectral conversion functionality simultaneously enables eye protection, achieving dual performance characteristics of environmental shielding and visual health preservation.

In a further embodiment, the inorganic nanoparticles in step (S1) are inorganic metal oxides, selected from at least one of nano silicon oxide, nano aluminum oxide, nano zinc oxide, and nano zirconium oxide. These metal oxides are selected to ensure that the inorganic nanoparticles stably participate in cross-linking reactions and enhance the compactness of the microscopic barrier structure. The chemical stability of the metal oxides improves weather resistance of the protector and further protects the nano-luminescent materials.

In a further embodiment, the inorganic nanoparticles in step (S1) exhibit a particle size of 2 nm-100 nm. Within this range, the nanoparticles have a large specific surface area and a high surface hydroxyl density, providing abundant cross-linking sites and facilitating the formation of a uniform and dense protection network. In addition, this particle size range mitigates light scattering caused by oversized particles or agglomeration caused by undersized particles, thereby improving cross-linking density and enhancing moisture-oxygen barrier capabilities. Moreover, the transparency of the light conversion layer is maintained to avoid affecting the screen display effect.

In a further embodiment, the cross-linking material is a silane coupling agent (including γ-aminopropyltriethoxysilane (KH-550), γ-glycidyloxypropyltrimethoxysilane (GPTMS)) or a bifunctional ligand (including mercaptopropionic acid (MPA), dithiothreitol (DTT)). The functional groups at both ends of the molecule can bind to inorganic nanoparticles (via hydroxyl groups) and nano-luminescent materials (including quantum dot surface ligands) respectively, achieving a "bridging" effect while avoiding luminescence quenching caused by direct contact between the two components. The silane coupling agent is selected from at least one of γ-aminopropyltriethoxysilane (KH-550), N-β-(aminoethyl)-γ-aminopropyltrimethoxysilane (KH-792), γ-mercaptopropyltrimethoxysilane (KH-590), γ-glycidyloxypropyltrimethoxysilane (GPTMS), vinyltriethoxysilane (VTES), γ-methacryloxypropyltrimethoxysilane (KH-570), and β-(3,4-epoxycyclohexyl)ethyltrimethoxysilane. The bifunctional ligand is selected from at least one of mercaptopropionic acid (MPA), thioglycolic acid (TGA), thiol-polyethylene glycol-thiol (Thiol-PEG-Thiol), bis-mercaptoethylamine, and dithiothreitol (DTT). These crosslinking materials enable stable binding between the inorganic nanoparticles and the nano-luminescent materials, ensuring the integrity of the protective structure. They also prevent the reduction in luminous efficiency of the nano-luminescent materials due to direct contact with inorganic nanoparticles, thus maintaining spectral conversion performance.

In a further embodiment, the nano-luminescent materials in step (S1) are selected from at least one of group II-VI compounds, group III-V compounds, group I-III-VI compounds, group II-IV-VI compounds, inorganic perovskite semiconductors, and organic-inorganic hybrid perovskite semiconductors, where the group II-VI compounds are selected from at least one of CdS, CdSe, CdTe, ZnS, ZnSe, and ZnTe, and the group III-V compounds are selected from at least one of GaP, GaAs, InP and InAs. This type of materials exhibits excellent light absorption and conversion properties, capable of specifically absorbing 400 nm-480 nm blue light and emitting 500 nm-750 nm visible light, ensuring that the protector can efficiently absorb harmful blue light and convert it into beneficial spectra, thereby achieving eye protection. The selection of materials balances luminous efficiency and stability, adapting to the spectral requirements of different scenarios.

In a further embodiment, a mass ratio of the inorganic nanoparticles to the nano-luminescent materials in step (S1) is 10:1 to 0.1:1. This range achieves a balance between "protection capability" and "luminous efficiency", where a too high ratio reduces the proportion of luminescent materials, affecting spectral conversion, and a too low ratio fails to form an effective barrier structure, thus weakening the protective effect.

In a further embodiment, the dispersion method described in step (S2) includes ultrasonic dispersion or stirring dispersion, both of which are applied to break up agglomeration of nanoparticles through mechanical force or cavitation effects, so that the modified nanoparticles are evenly dispersed in the OCA material, avoiding local uneven light conversion efficiency or structural defects caused by nanoparticle agglomeration, ensuring consistent performance of the light conversion layer performance, and improving product reliability.

In a further embodiment, the adhesive layer has a coating thickness of 50 μm-250 μm, which achieves a balance between the "light conversion efficiency" and "film performance", where a too thin coating results in insufficient luminescent materials and weak conversion effects, and a too thick coating reduces the flexibility of the film layer and deteriorates adhesion. This thickness range ensures sufficient absorption and conversion of blue light (via adequate thickness), and enables the film layer to adapt to different screen curvatures (via moderate flexibility), thus integrating eye protection functionality with user experience.

In a further embodiment, the structure of the eye protecting screen protector includes, from outside to inside, tempered glass, a light conversion layer, a PET transparent film, a silicone layer and a release film, where each layer has a distinct function, that is, the tempered glass provides wear-resistant protection, the light conversion layer achieves eye protection, the PET support film ensures structural strength, the silicone layer achieves adhesion and removability, and the release film protects the adhesive layer when not in use. This structure integrates protection (wear resistance, scratch resistance), eye protection (spectral conversion), and usability (easy adhesion, easy peelability), meeting the comprehensive performance requirements of screen protectors.

In one embodiment, an eye-protecting screen protector is prepared by the method described above, for use with display screens in mobile phones, tablet computers, laptops or televisions. The protector ensures stable eye protection functionality (absorption of harmful blue light) and a long service life (protection of nano-luminescent materials), allowing for wide application in various electronic devices and enhancing visual health protection for users.

Compared with the existing technologies, this disclosure has the following advancements: Long-term stability: a dense moisture-oxygen barrier network is constructed through the cross-linked structure of inorganic nanoparticles and nano-luminescent materials, reducing erosion of nano-luminescent materials by moisture and oxygen, thereby extending the product service life by more than 1.5 times and increasing the luminous efficiency retention rate by more than 30%.

Efficient eye protection: the nano-luminescent materials stably absorb 400 nm-480 nm harmful blue light and convert and emit 500 nm-750 nm beneficial spectra. The blue light absorption rate reaches 30%-40%, and the proportion of beneficial spectra is increased by more than 20%, significantly alleviating visual fatigue.

Strong versatility: it is suitable for various screens of mobile phones, tablet computers, laptops, televisions and other similar devices. Structural adjustments may be made according to needs, including the addition of a privacy layer, to adapt to different application scenarios.

Reliable process: mature processes including UV curing are employed. Raw materials are readily available, large-scale production is achievable, and costs are controllable.

BRIEF DESCRIPTION OF DRAWINGS

To more clearly illustrate the technical solutions in the embodiments of this disclosure, a brief description of the accompanying drawings required for explaining the embodiments is provided below. Obviously, the accompanying drawings described below are only some embodiments of this disclosure. For those skilled in the art, other drawings can be obtained based on these drawings without creative work.

FIG. 1 is a schematic flow diagram according to an embodiment of this disclosure;

The reference numerals in the figures are:

1. tempered glass; 2. light conversion layer; 3. polyethylene terephthalate (PET) transparent film; 4. silicone layer; 5. release film; 6. optically transparent adhesive layer; 7. repair layer; 8. thermoplastic polyurethane (TPU) transparent film; 9. privacy layer.

The accompanying drawings have shown specific embodiments of this disclosure, which will be described in more detail below. These drawings and textual descriptions are not intended to limit the scope of the inventive concept in any way, but rather to explain the concept of this disclosure to those skilled in the art by referring to specific embodiments.

DETAILED DESCRIPTION OF THE EMBODIMENTS

The technical solutions in the embodiments of this disclosure will be described clearly and completely below in conjunction with the drawings in the embodiments of this disclosure. Obviously, the described embodiments are only part of the embodiments of this disclosure, rather than all of the embodiments. Based on the embodiments of this disclosure, all other embodiments obtained by those skilled in the art without making any creative work shall fall within the scope of protection of this disclosure.

To make the technical solutions and advantages of this disclosure clearer, the embodiments of this disclosure will be described in further detail below with reference to the accompanying drawings.

Example 1: Nano Silicon Oxide-CdSe Quantum Dot Protector Based on Structure in FIG. 3 and Process in FIG. 1

Figure 3:
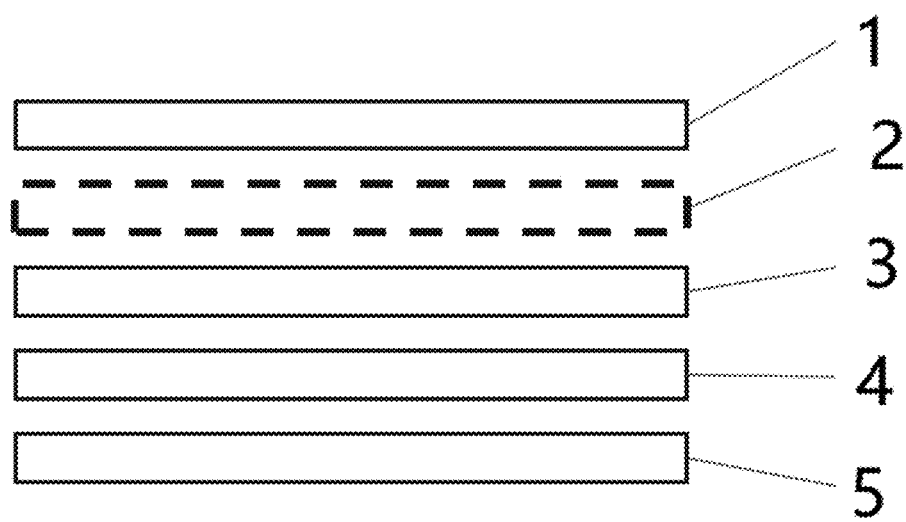
FIGS. 3-8 are similar schematic diagrams of different structures according to embodiments of this disclosure.

Corresponding Structure and Process: reference is made to FIGS. 1 and 3. The core process of this example includes a four-step process of raw material preparation, adhesive mixing, coating and curing, and glass lamination in FIG. 1. The final product structure from top to bottom consists of tempered glass 1, light conversion layer 2, polyethylene terephthalate (PET) transparent film 3, silicone layer 4, and release film 5.

Nano silicon oxide particles (20 nm, surface hydroxyl groups, ethanol dispersion) are selected as inorganic nanoparticles, γ-aminopropyltriethoxysilane (KH-550, a silane coupling agent) is selected as a cross-linking material, and CdSe quantum dots (oleic acid ligands, toluene dispersion) are selected as nano-luminescent materials. Additional components include OCA resin (polyurethane acrylate), 1-hydroxycyclohexyl phenyl ketone (HCPK) photoinitiator, 0.3 mm tempered glass, and 50 μm PET substrate.

During the preparation, Nano silicon oxide particles and CdSe were weighed at a mass ratio of 5:1, 10 g of a silica ethanol solution (10% solids content) were mixed with 1 g of KH-550, and magnetically stirred at 500 rpm for 30 min to enable binding between amino groups and silica hydroxyl groups. Separately, 2 g of a CdSe toluene solution (5% solids content) were dispersed in 5 mL of isobornyl acrylate (IBOA) monomer, acting as an active diluent. After stirring to clarify, the CdSe-IBOA dispersion was added to the silica-containing system. The combined mixture was continuously stirred for 60 min to form surface-modified nanoparticles.

Adhesive Mixing: the modified nanoparticles were added to 50 g of OCA resin, and dispersed by ultrasonication (300 W, 20 min). Subsequently, 0.5 g of HCPK was added, and the resulting mixture was stirred well for 15 min.

Coating and Curing: the mixture was coated onto a PET substrate pre-coated with a silicone layer at a thickness of 100 μm, and cured under UV light (365 nm, 80 mW/cm$^2$, 30 s) to form the light conversion layer 2.

Glass Lamination: the tempered glass 1 was laminated onto the surface of the light conversion layer via roll pressing (0.3 MPa). The release film 5 was subsequently applied to complete the multilayer structure, and the composite was precision-cut to yield a final product.

Figure 2:
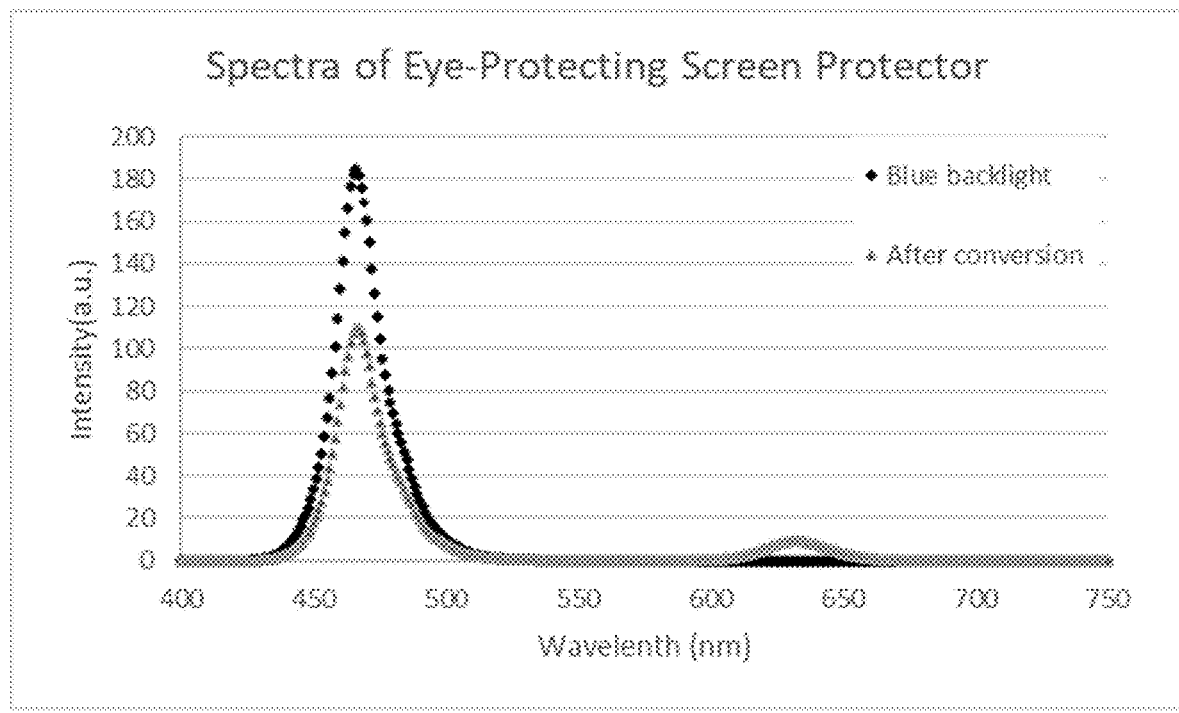
FIG. 2 is a schematic diagram of test results according to an embodiment of this disclosure.

Testing was performed as follows: the screen was set to a pure blue background (with a main peak at 450 nm, corresponding to the "blue background" curve in FIG. 2), and signals were recorded with a spectrometer. After applying the protector of this example, the conversion spectrum was recorded (corresponding to the "screen protector converted red light spectrum" curve in FIG. 2). Test results demonstrated that the relative intensity of blue light at 400-480 nm dropped from 180 to 110 (left band in FIG. 2), and the relative intensity of 550-650 nm red light increased to 120 (right band in FIG. 2), exhibiting a blue light absorption rate of 38% consistent with the spectral conversion trend shown in FIG. 2. After accelerated aging (85° C./85% RH, 1,000 h), the red light intensity retention rate was 82%, verifying the moisture and oxygen barrier effect of the cross-linked structure.

Example 2: Nano Aluminum Oxide-InP Quantum Dot Protector Based on Structure in FIG. 4 and Process in FIG. 1

Figure 4:
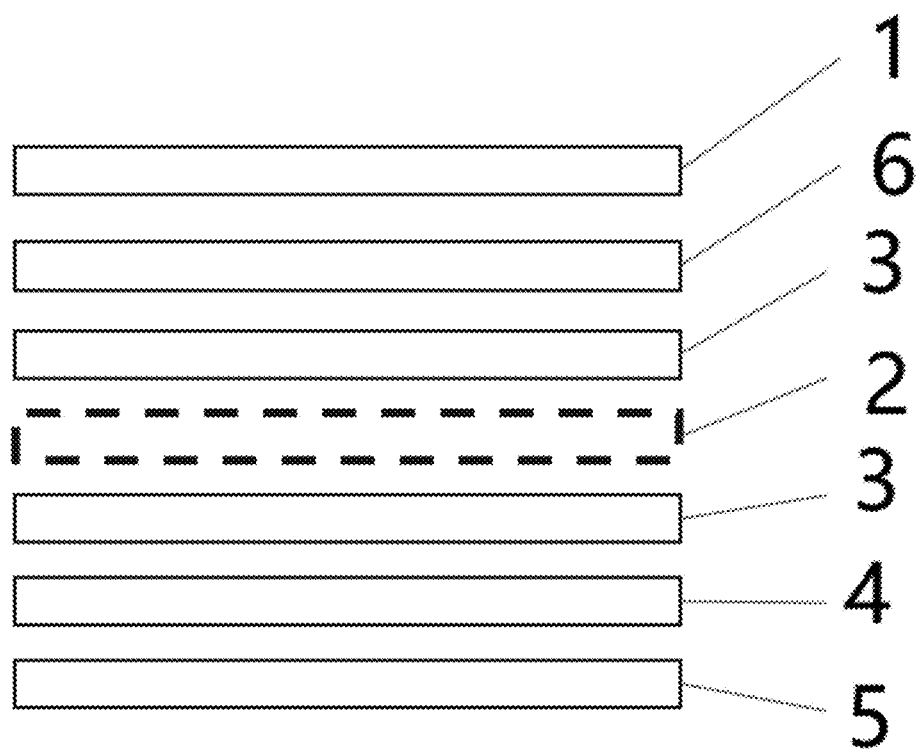

Corresponding Structure and Process: reference is made to FIGS. 1 and 4. In FIG. 4, an optically clear adhesive layer 6 was added on the basis of Example 1 to improve the binding strength between the tempered glass and the PET. The preparation process strictly followed the four-step process in FIG. 1.

Nano aluminum oxide particles (50 nm, isopropanol dispersion) are selected as the inorganic nanoparticles, MPA (mercaptopropionic acid, bifunctional ligand) is selected as the cross-linking material, and InP/ZnS core-shell quantum dots (oleylamine ligand, n-hexane dispersion) are selected as the nano-luminescent material. Additional components include polyacrylate OCA, Benzophenone (BP) photoinitiator, 0.2 mm tempered glass, 75 μm PET substrate, and optically clear adhesive 6.

Raw Material Preparation: Alumina and InP/ZnS were weighed at a mass ratio of 1.5:1.8 g of alumina isopropanol solution (15% solids content) were mixed with 0.8 g of MPA and ultrasonically dispersed for 15 min (200 W) to enable binding between carboxyl groups and alumina hydroxyl groups. Separately, 8 g of an InP/ZnS solution (2.5% solids content) were dispersed in 8 mL of trimethylolpropane triacrylate (TMPTA) monomer and added to the previous system, followed by stirring at 600 rpm for 45 min.

Adhesive Mixing: the mixture was added to 60 g of OCA resin, and stirred mechanically (1,000 rpm, 30 min). Subsequently, 0.6 g of BP was added and mixed well.

Coating and Curing: the resulting mixture was coated onto the surface of the lower PET with a thickness of 150 μm, and cured under UV light (395 nm, 100 mW/cm$^2$, 20 s) to form the light conversion layer 2, and another layer of PET was laminated onto the cured light conversion layer.

Glass Lamination: the tempered glass 1 was laminated by an optically transparent adhesive layer 6, and a silicone layer 4 and a release film 5 were sequentially laminated below, yielding a product with the structure shown in FIG. 4.

Example 3: Nano Zinc Oxide-ZnSe Protector Based on Structure in FIG. 5 and Process in FIG. 1

Figure 5:
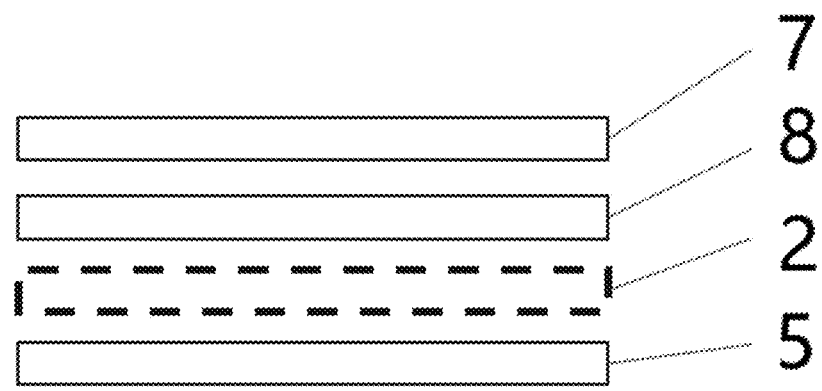

Referring to FIGS. 1 and 5, the tempered glass in FIG. 5 is replaced by a thermoplastic polyurethane (TPU) transparent film 8, and a privacy layer 9 is added. The process still follows the four-step core process in FIG. 1.

Raw Material Selection: nano zinc oxide particles (10 nm, water-ethanol mixture) are selected as the inorganic nanoparticles, GPTMS (epoxy silane coupling agent) is selected as the cross-linking material, and ZnSe nanocrystals (thioglycolic acid ligands, aqueous dispersion) are selected as the nano-luminescent material. Additional components include OCA blended resin, 2-Hydroxy-2-methylpropiophenone (HMPP) photoinitiator, 100 μm TPU film, and privacy layer 9 (30° viewing angle).

Zinc oxide and ZnSe were weighed at a mass ratio of 10:1.15 g of a zinc oxide mixed solution (8% solids content) were mixed with 1.2 g of GPTMS, and stirred in a 60° C. water bath at 400 rpm for 40 min to enable reaction between epoxy groups and hydroxyl group. Separately, 1.2 g of a ZnSe aqueous dispersion (10% solids content) were added to the system and stirred for 50 min.

The mixture was added to 70 g of OCA blended resin and ultrasonically dispersed (400 W, 15 min). Subsequently, 0.7 g of HMPP was added and stirred well.

Coating and Curing: the mixture was coated onto the surface of the release film 5 (thickness: 50 μm), and cured under UV light (365 nm, 60 mW/cm$^2$, 40 s) to form the light conversion layer 2.

Lamination and Compounding: the privacy layer 9 and the TPU transparent film 8 were sequentially laminated onto the light conversion layer 2 via thermal pressing (60° C., 0.1 MPa), yielding a product with the structure shown in FIG. 5.

Example 4: Nano Zirconium Oxide-GaP Protector Based on Structure in FIG. 6 and Process in FIG. 1

Figure 6:
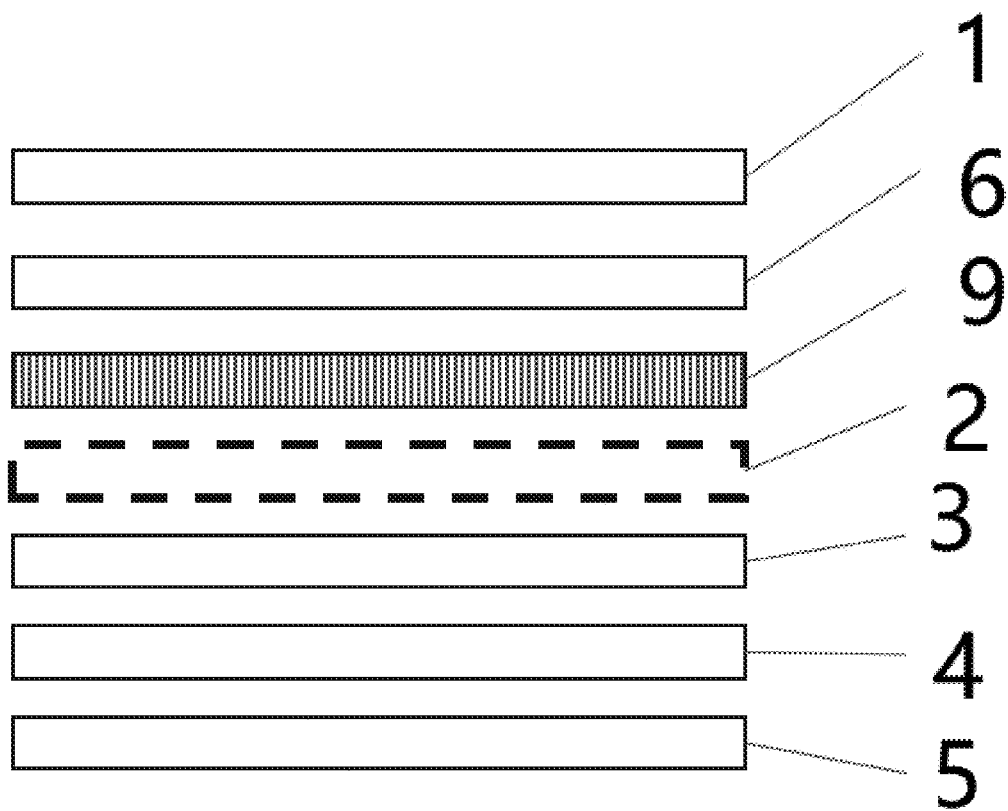

Corresponding Structure and Process: reference is made to FIGS. 1 and 6. In FIG. 6, the tempered glass 1, the optically transparent adhesive 6, and the privacy layer 9 are integrated. The process is strictly carried out according to the four steps in FIG. 1 to adapt to laptop screens.

Raw Material Selection: nano zirconium oxide particles (80 nm, ethanol dispersion) are selected as the inorganic nanoparticles, DTT (dithiothreitol, dithiol ligand) is selected as the cross-linking material, and GaP nanocrystals (trioctylphosphine ligand, toluene dispersion) are selected as the nano-luminescent material. Additional components include polyacrylate OCA, BP+HCPK composite initiator, 0.3 mm tempered glass, and privacy layer 9 (45° viewing angle).

Raw Material Preparation: zirconium oxide and GaP were weighed at a mass ratio of 0.5:1.5 g of a zirconium oxide solution (20% solids content) were mixed with 0.5 g of DTT and dispersed via ultrasonication for 20 min to enable binding between thiol groups and hydroxyl groups. Separately, 10 g of GaP toluene solution (5% solids content) were dispersed in 10 mL of IBOA monomer and added to the system, followed by stirring for 60 min.

Adhesive Mixing: the mixture was added to 80 g of OCA resin and stirred mechanically (800 rpm, 30 min), after which 0.8 g BP+HCPK composite initiator was added and mixed well.

Coating and Curing: the mixture was coated onto the PET surface (thickness: 250 μm), and cured under UV light (395 nm, 120 mW/cm$^2$, 25 s) to form a light conversion layer 2.

Glass Lamination: the privacy layer 9, the optical transparent adhesive 6, and the tempered glass 1 were sequentially laminated onto the light conversion layer 2, and the silicone layer 4 and the release film 5 were laminated onto the lower surface of the light conversion layer 2, yielding a product with the structure shown in FIG. 6.

Example 5: Composite Particle-CdTe Protective Film Based on Structure in FIG. 7 and Process in FIG. 1

Figure 7:
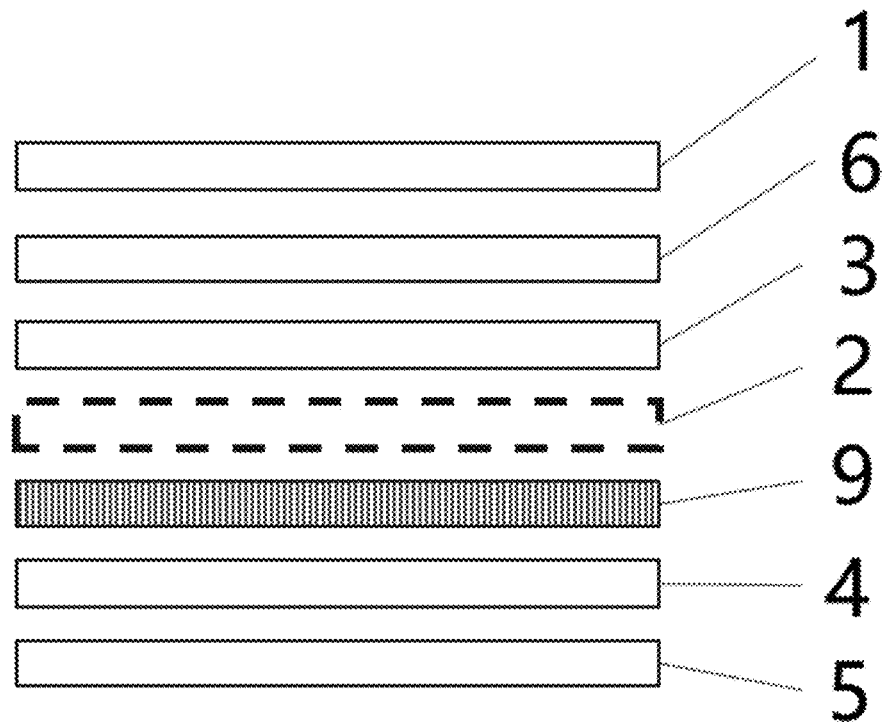

Reference is made to FIGS. 1 and 7. In FIG. 7, the privacy layer 9 is positioned below the light conversion layer 2 to reduce spectral interference.

Raw Material Selection:

A 1:1 mixture of nano silicon oxide particles (30 nm) and nano aluminum oxide particles (40 nm) is selected as the inorganic nanoparticles, KH-792 (bisaminosilane coupling agent) is selected as the cross-linking material, and CdTe quantum dots (oleic acid ligand, toluene dispersion) are selected as the nano-luminescent material. Additional components include OCA resin, HCPK initiator, and adjustable angle privacy layer 9 (30°-60°).

Raw Material Preparation: composite particles and CdTe were weighed at a mass ratio of 3:1.10 g of the composite particle solution (12% solids content) were mixed with 1 g of KH-792, and stirred at 50° C. for 30 min. Separately, 4 g of the CdTe solution (5% solids content) were dispersed in 6 mL of TMPTA and added to the system, followed by stirring for 50 min.

Adhesive Mixing: the mixture was added to 60 g of OCA resin and ultrasonically dispersed (300 W, 20 min). Then, 0.6 g of HCPK was added and mixed well.

Coating and Curing: the mixture was coated onto the PET surface (thickness: 200 μm) and cured under UV light to form the light conversion layer 2.

Glass Lamination: the PET film, the optically clear adhesive 6, and the tempered glass 1 were sequentially laminated onto the upper surface of the light conversion layer 2. The privacy layer 9, the silicone layer 4, and the release film 5 were laminated onto the lower surface, yielding a product with the structure shown in FIG. 7.

Example 6: Zinc Oxide-Perovskite Protector Based on Structure in FIG. 8 and Process in FIG. 1

Figure 8:
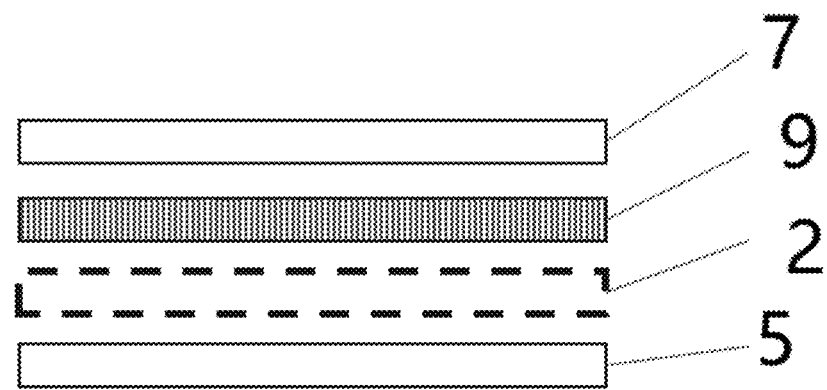

Reference is made to FIGS. 1 and 8. In FIG. 8, the repair layer 7 (thermal repairable silicone) is added, and the process is adjusted according to the four steps in FIG. 1 to adapt to high-end mobile phones.

Raw Material Selection:

Nano zinc oxide particles (2 nm, ethanol dispersion) are selected as the inorganic nanoparticles, Thiol-PEG-Thiol is selected as the cross-linking material, and $CsPbBr_3$ perovskite quantum dots (ammonium oleate ligand, toluene dispersion) are selected as the nano-luminescent material. Additional components include OCA resin, HMPP initiator, 50 μm repair layer 7 (thermal-repairable at 60° C.).

Raw Material Preparation: zinc oxide and perovskite were weighed at mass ratio of 0.1:1.1 g of zinc oxide solution (10% solids content) was mixed with 0.1 g of Thiol-PEG-Thiol, and stirred at room temperature for 20 min. Separately, 10 g of perovskite solution (1% solids content) were dispersed in 8 mL of IBOA and added to the system, followed by stirring for 40 min.

Adhesive Mixing: the mixture was added to 50 g of OCA resin and stirred mechanically (1,200 rpm, 25 min). Then, 0.5 g of HMPP was added and mixed well.

Coating and Curing: the mixture was coated onto the surface of the release film 5 (thickness: 120 μm) and cured under UV light to form the light conversion layer 2.

Lamination and Compounding: the privacy layer 9 and the repair layer 7 (thermally pressed at 50° C.) were sequentially laminated onto the upper surface of the light conversion layer 2, yielding a product with the structure shown in FIG. 8.

All examples follow the four-step preparation process in FIG. 1, with product structures corresponding to FIG. 3-8. The spectral conversion effects conform to the characteristics shown FIG. 2: the relative intensity of 400-480 nm blue light decreased significantly, and the intensity of 500-750 nm beneficial spectra increased. Through connection of inorganic nanoparticles and nano-luminescent materials via cross-linking materials, the dense structure formed ensures that the luminous efficiency retention rate of all products after aging is maintained at ≥70%, representing an improvement of more than 30% compared with the traditional process. This verifies the synergistic advantages of this disclosure in moisture-oxygen barrier properties and eye-protecting functionality. The test method strictly follows the "pure blue background-spectral recording-protective film conversion" procedure, ensuring data consistency with the trend in FIG. 2 and proving the process stability and reliability.

Other embodiments of this disclosure will be apparent to those skilled in the art from consideration of the specification and practice of this disclosure. This application is intended to cover any modifications, uses or adaptive changes of this disclosure, which follow the general principles of this disclosure and include common general knowledge or customary technical means in the art not disclosed herein. It is intended that the specification and examples be considered as exemplary only, with a true scope and spirit of this disclosure being indicated by the appended claims.

It will be appreciated that this disclosure is not limited to the exact structures that have been described above and shown in the accompanying drawings, and that various modifications and changes may be made without departing from the scope of this disclosure. The scope of this disclosure is limited only by the appended claims.

What is claimed is:

1. A method for preparing an eye-protecting screen protector, comprising the following steps:
   (S1) raw material preparation: mixing inorganic nanoparticles surface-modified with hydroxyl ligands with a cross-linking material to allow binding between first functional groups of the cross-linking material and hydroxyl groups on the surfaces of the inorganic nanoparticles;
   dispersing nano-luminescent materials in acrylate monomers, adding the resulting mixture to the nanoparticle-crosslinking material system, enabling binding between second functional groups of the cross-linking material and the nano-luminescent materials, to form modified nanoparticles;
   (S2) adhesive mixing: dispersing the modified nanoparticles from step (S1) in an optically clear adhesive (OCA) matrix material, adding a photoinitiator and mixing evenly;
   (S3) coating and curing: coating the mixed adhesive solution from step (S2) onto the surface of a polyethylene terephthalate (PET) substrate with a pre-applied silicone layer, and then curing the coated substrate with ultraviolet light to form a light conversion layer; and
   (S4) glass lamination: laminating tempered glass on the surface of the light conversion layer, and then precision-cutting the resulting composite structure to obtain an eye-protecting screen protector;
   wherein the inorganic nanoparticles and the nano-luminescent materials are cross-linked after UV curing to form a dense microscopic isolation protection structure.

2. The method for preparing an eye-protecting screen protector according to claim 1, wherein the inorganic nanoparticles in the step (S1) are inorganic metal oxides, selected from at least one of nano silicon oxide, nano aluminum oxide, nano zinc oxide, and nano zirconium oxide.

3. The method for preparing an eye-protecting screen protector according to claim 1, wherein the inorganic nanoparticles in the step (S1) have a particle size of 2 nm-100 nm.

4. The method for preparing an eye-protecting screen protector according to claim 1, wherein the cross-linking material in the step (S1) is a silane coupling agent or a bifunctional ligand;
   wherein the silane coupling agent is selected from at least one of γ-aminopropyltriethoxysilane (KH-550), N-β-(aminoethyl)-γ-aminopropyltrimethoxysilane (KH-792), γ-mercaptopropyltrimethoxysilane (KH-590), γ-glycidyloxypropyltrimethoxysilane (GPTMS), vinyltriethoxysilane (VTES), γ-methacryloxypropyltrimethoxysilane (KH-570), and β-(3,4-epoxycyclohexyl)ethyltrimethoxysilane; and
   wherein the bifunctional ligand is selected from at least one of mercaptopropionic acid (MPA), thioglycolic acid (TGA), thiol-polyethylene glycol-thiol (Thiol-PEG-Thiol), cystamine, bis-mercaptoethylamine, and dithiothreitol (DTT).

5. The method for preparing an eye-protecting screen protector according to claim 1, wherein the nano-luminescent materials in the step (S1) are selected from at least one of group II-VI compounds, group III-V compounds, group I-III-VI compounds, group II-IV-VI compounds, inorganic perovskite semiconductors, and organic-inorganic hybrid perovskite semiconductors;
   wherein the group II-VI compounds are selected from at least one of CdS, CdSe, CdTe, ZnS, ZnSe, and ZnTe, and the group III-V compounds are selected from at least one of GaP, GaAs, InP and InAs.

6. The method for preparing an eye-protecting screen protector according to claim 1, wherein a mass ratio of the inorganic nanoparticles to the nano-luminescent materials in the step (S1) is 10:1 to 0.1:1.

7. The method for preparing an eye-protecting screen protector according to claim 1, wherein the dispersion method in the step (S2) is ultrasonic dispersion or stirring dispersion.

8. The method for preparing an eye-protection screen protector according to claim 1, wherein the adhesive solution in the step (S3) has a coating thickness of 50 μm-250 μm.

9. The method for preparing an eye-protecting screen protector according to claim 1, wherein a structure of the eye-protection screen protector at least comprises: tempered glass or a TPU transparent film, a light conversion layer, a PET transparent film, a silicone layer and a release film, and further comprises at least one of an optically transparent adhesive layer, a privacy layer, and a repair layer.

10. An eye-protecting screen protector, being prepared by the method according to claim 1 and being used for display screens of mobile phones, tablet computers, laptops or televisions.

* * * * *